W. M. MILBURN.
FREEZER.
APPLICATION FILED JAN. 16, 1909.
944,625.
Patented Dec. 28, 1909.
2 SHEETS—SHEET 2.
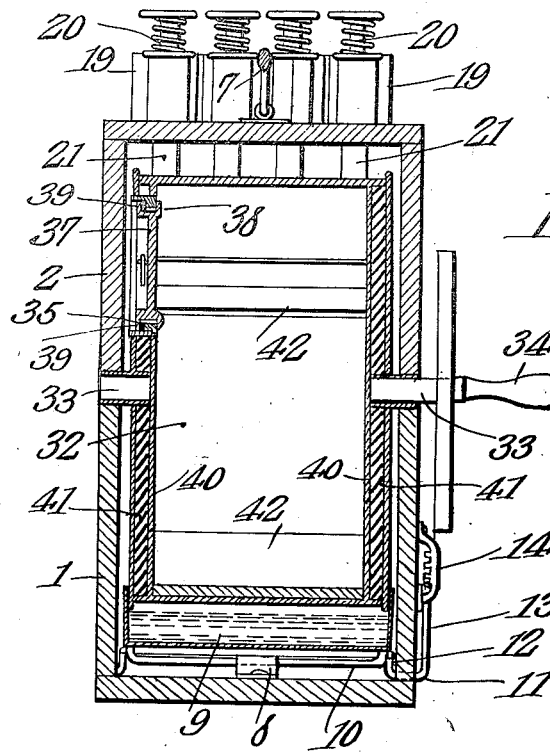
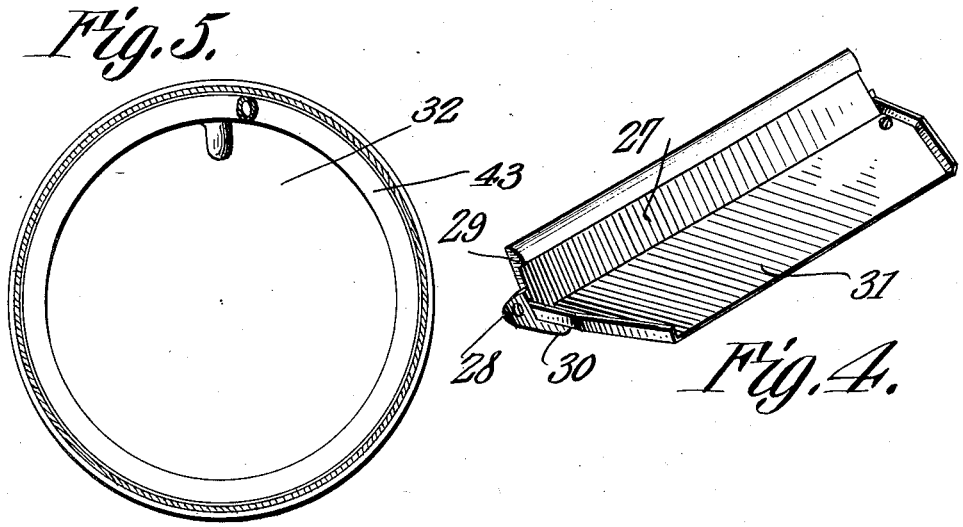
Witnesses
Inventor
William M. Milburn.
By C. A. Snow & Co.
Attorneys

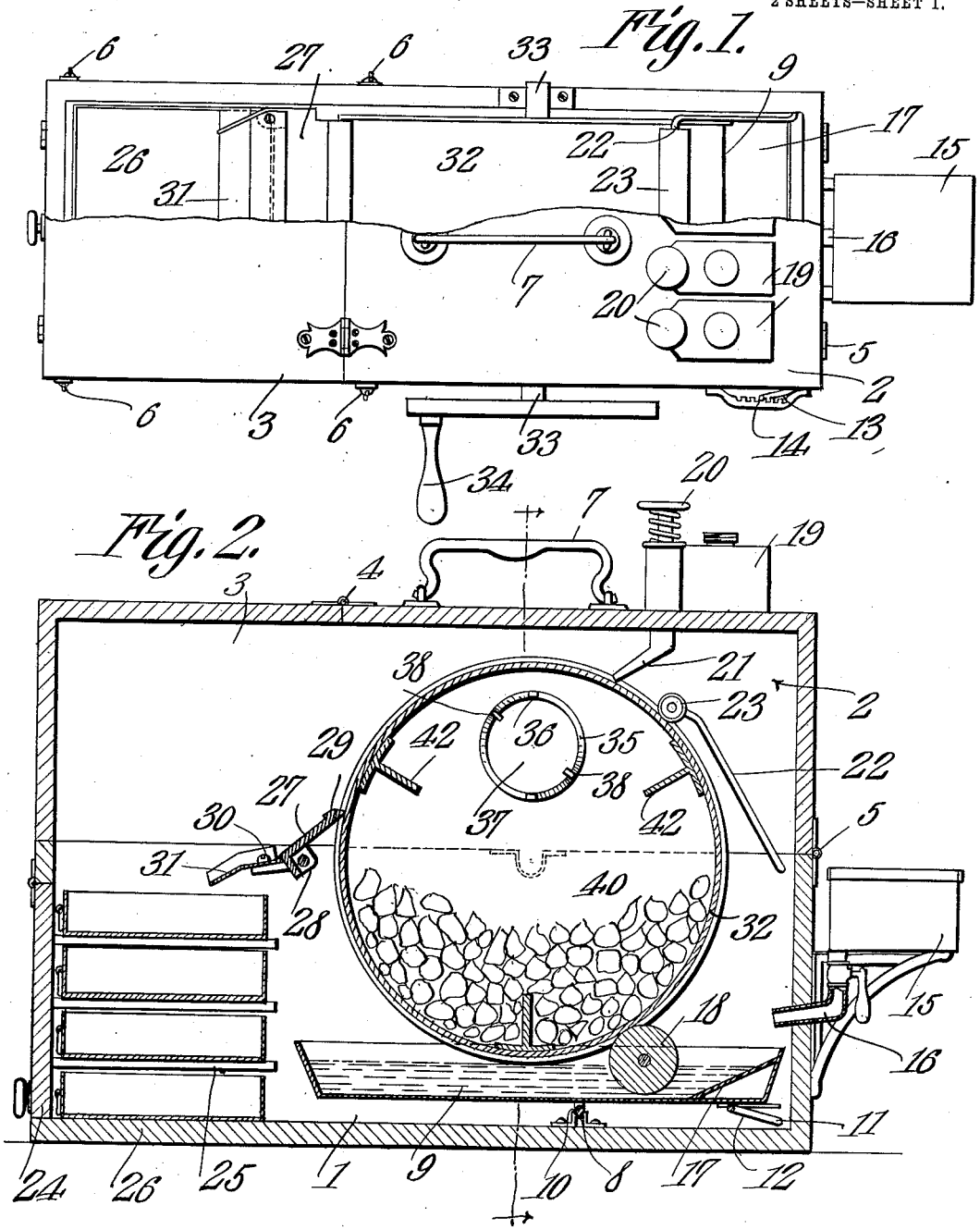

UNITED STATES PATENT OFFICE.

WILLIAM M. MILBURN, OF DENISON, TEXAS.

FREEZER.

944,625.

Specification of Letters Patent.

Patented Dec. 28, 1909.

Application filed January 16, 1909. Serial No. 472,734.

*To all whom it may concern:*

Be it known that I, WILLIAM M. MILBURN, a citizen of the United States, residing at Denison, in the county of Grayson and State of Texas, have invented a new and useful Freezer, of which the following is a specification.

This invention has relation to freezers, and it consists in the novel construction and arrangement of its parts, as hereinafter shown and described.

The object of the invention is to provide a portable freezer of simple construction, the parts of which are so arranged as to rapidly congeal cream or milk, provision being made to apply flavoring extracts to the same during the process of freezing.

With the above object in view the invention includes a casing in which is pivotally mounted a pan adapted to contain the cream or milk. Means is provided for tilting the pan and a roll is journaled in the pan, the lower side of which is in close proximity to the bottom thereof. A cylinder is journaled for rotation in the casing, and the lower portion of said cylinder is over the middle portion of the said pan, and the said cylinder, at its lower portion, comes in contact with the periphery of the roll which is journaled in the pan. The said cylinder is adapted to contain the freezing agent, and is provided with means for its introduction and removal. A knife is pivotally mounted in the casing and bears, at its edge, against the side of the cylinder, and is provided with a chute which is adapted to direct the frozen material into one of a series of removable pans, or into other suitable receptacle, provided for its reception.

In the accompanying drawings:—Figure 1 is a top plan view of the freezer, with parts broken away: Fig. 2 is a vertical sectional view of the freezer: Fig. 3 is a transverse vertical sectional view of the freezer: Fig. 4 is a perspective view of the knife used in the freezer: Fig. 5 is a vertical sectional view of a modified form of cylinder which may be used in the freezer.

The freezer consists of a casing which includes a bottom portion 1 and the top portions 2 and 3. The portion 3 is hinged to the portion 2 at the point 4, while the portion 2 is hinged to the portion 1 at the point 5. Suitable securing devices, as, for instance, hooks 6—6 (shown in Fig. 1 of the drawings) may be provided for holding the portions 2 and 3 closed against the portion 1 of the casing of the freezer. A handle 7 is mounted upon the portion 2 and may be conveniently used for carrying the freezer from place to place. A bearing 8 is mounted upon the bottom of the casing portion 1, and the pan 9 is provided with a trunnion 10, which normally rests in the bearing 8. The shaft 11 is journaled in the sides of the portion 1 of the casing and is provided with an intermediate crank portion 12, which lies under one end of the pan 9. The said shaft 11 is preferably formed of spring wire and is provided with an end portion 13, exteriorly located with relation to the casing portion 1 and which is adapted to engage the teeth of a rack-bar 14 attached to the outer side of the casing portion 1. A tank 15 is mounted at one end of the casing portion 1 and is provided with a valved spout 16, which passes through the end of the casing portion 1 and terminates over one end of the pan 9. The pan 9 is provided at that end adjacent this spout 16 with an inclined section 17 which is located in the bottom of the pan and is inclined downwardly toward the point upon which the said pan 9 is pivoted. A roll 18 is journaled for rotation in the sides of the pan 9 and the lower edge of the said roll is in close proximity to the bottom of the pan 9.

The receptacles 19 are located upon the top of the casing portion 2 and each of said receptacles 19 is adapted to contain a flavoring extract. Each receptacle 19 is provided with a valve 20 and an outlet 21. The outlets of the said receptacles 19 are located over the upper portion of the freezing cylinder (hereinafter to be described) which is journaled for rotation in the casing of the freezer. A bail 22 is pivoted at its ends in the sides of the casing portion 1 and is provided, upon its intermediate portion, with a journaled roll 23, which is adapted to operate against the periphery of the cylinder to be described hereinafter.

That end of the casing portion 1 opposite to the end thereof at which the tank or receptacle 15 is mounted is provided with a hinged door 24, and the vertical sides of the casing portion 1 adjacent the said door 24 are provided with the guides 25, which are adapted to support the removable trays 26. The lower tray 26 of the series is adapted to rest upon the bottom of the casing portion 1 in the manner as illustrated in Fig. 2 of the drawings. A knife 27, of peculiar configuration, is provided to coöperate with the cylinder above referred to and hereinafter to be explained, for the purpose of removing the frozen material from the same. The said knife 27 is preferably formed from cast metal and is provided with the depending lugs 28 which are pivotally connected with the vertical sides of the casing portion 1. The material of which the knife 27 is formed is thickened in the vicinity of the edge of the said knife as at 29, thereby weighting the edge portion of the knife and providing means having a tendency to hold the edge of the knife in close relation to the periphery of the cylinder referred to. The knife 27 is provided with the rearwardly disposed lugs 30 and a chute 31 is soldered or otherwise suitably secured to the said lugs 30 and is downwardly disposed at that edge portion opposite the edge thereof which has contact with the knife 27. The downwardly disposed edge portion of the chute 31 is located over the trays 26 or that portion of the casing portion 1 which usually receives the said trays 26.

A cylinder 32 (preferably formed from thin sheet metal) is provided at its ends with the gudgeons 33, which are journaled in recesses provided at the upper edges of the side portions of the casing portion 1. A crank handle 34 is mounted upon one of the gudgeons 33 and is located exteriorly of the casing portion 1. The lower portion of the cylinder 32 projects into the pan 19 and has contact with the periphery of the roll 18. The cylinder 32 is provided at one end and at one side of its center with an opening 35, having at its edge the recesses 36. A cap or plug 37 is provided for closing the opening 35, and said cap is provided with the lugs 38 which are of such dimensions as to readily pass through the recesses 36 at the edge of the opening 35 and when the said plug 37 is rotated the said lugs 38 will be carried beyond said recesses 36 and will come in contact with the edge portion of the opening 35, whereby the flange 39 of the plug 37 will be brought into close contact with the edge of the opening 35, thus effecting a water-tight closure for the said opening.

The false heads 40 are located within the cylinder 32 and the space between the said false heads 40 and the ends of the cylinder are filled with material 41, such as asbestos, charcoal, or other non-heat-conducting material.

As illustrated in Fig. 2 of the drawings, the cylinder 32 may be provided in its interior with the radially disposed wings 42, which are connected at their outer edge portions with the periphery of the cylinder.

In the form of the invention as illustrated in Fig. 2 of the drawings the cylinder is so constructed as to use ice and salt as a freezing agent, while in the form of the invention as illustrated in Fig. 5 the parts are so arranged as to use a liquid as a freezing agent.

As shown in Fig. 5, the coil 43 is located in the cylinder 32 in close proximity to the periphery thereof, and the said coil 43 is adapted to contain ammonia, ether, or other similar freezing agent, in liquid form.

The freezer operates as follows:—A freezing agent, or a mixture constituting a freezing agent, is placed within the cylinder 32. This of course is done through the opening 35 by first removing the cap 37. The cap 37 is then reseated in position upon the opening 35. The operator then rotates the cylinder 32 upon its gudgeons through the instrumentality of the crank-arm 34. Prior to which, or at the same time, cream or milk may be passed from the tank 15 through the spout 16 into the pan 9. As the said cylinder 32 rotates and its lower portion is in contact with the periphery of the roll 18, the said roll 18 is rotated and carries up upon its periphery by the force of attraction the liquid or a thin layer thereof from that contained within the pan 9. The liquid thus carried up is brought in contact with the chilled periphery of the cylinder 32 and is congealed thereon in a thin film or sheet. This passes up under the roll 23 upon the bail 22 and is compacted thereon, just after which it passes under the outlet 21 of one of the flavoring extract containing tanks 19. The operator then operates the valve 20 of the said tank and permits the flavoring extract to pass therefrom through the outlet 21 upon the material congealed upon the periphery of the cylinder 32. As the said cylinder continues in its rotation the flavored congealed material is carried around until it comes in contact with the sharpened edge portion of the knife 27, at which point it is removed from the periphery of the cylinder and passes down by gravity and centrifugal force into the chute 30, from whence it will fall into the uppermost pan 26. This pan is then removed from the casing portion 1, and the operation above described may be repeated, and, if desired, a different flavoring extract may be applied to the next quantity of material that is frozen, so that the next pan 26 of the series may receive a quantity of frozen material bearing a different flavor from that just previously served. Or, if desired, all of the trays 26 may be removed and a large receptacle inserted in the end portion of the casing portion 1 in lieu thereof, which large receptacle may be filled with frozen material.

It will be noted that the lower portion of the cylinder 32 is above the upper surface of the liquid contained within the pan 9 and that the said liquid is transmitted to the periphery of the cylinder 32 through the instrumentality of the roll 18, the lower portion of which is immersed in the said liquid and the upper portion of which has contact with the periphery of the cylinder as described.

Having described my invention, what I claim as new, and desire to secure, by Letters Patent, is:—

A freezer comprising a casing, a pan located in the casing, a roll journaled for rotation in the pan, a cylinder journaled for rotation in the casing and having the lower portion of its periphery in contact with the roll, a plurality of flavor-containing tanks located upon the casing and having outlets above the cylinder, a knife mounted in the casing and having an edge coöperating with the periphery of the cylinder, and a series of removable trays located in the casing below the discharge portion of the knife.

In testimony that I claim the foregoing as my own, I have hereto affixed my signature in the presence of two witnesses.

WILLIAM M. MILBURN.

Witnesses:
J. F. PAINTER,
P. W. GLAZIER.